April 1, 1924.
F. G. LEE
TIRE CHAIN
Filed March 29, 1923
1,488,887
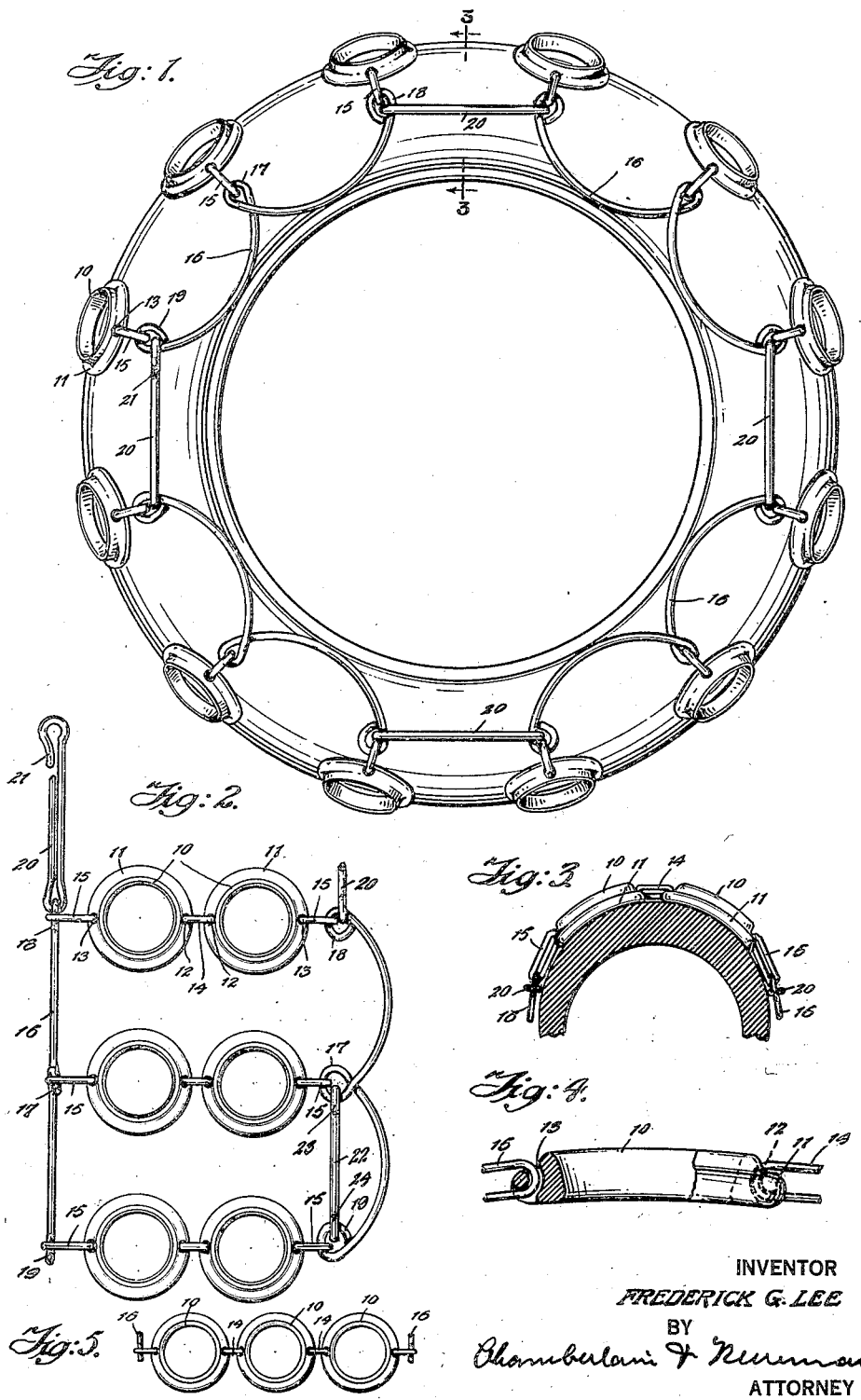
INVENTOR
FREDERICK G. LEE
BY
Chamberlain & Newman
ATTORNEY Patented Apr. 1, 1924.

1,488,887

UNITED STATES PATENT OFFICE.

FREDERICK G. LEE, OF DANBURY, CONNECTICUT.

TIRE CHAIN.

Application filed March 29, 1923. Serial No. 628,465.

*To all whom it may concern:*

Be it known that FREDERICK G. LEE, a citizen of the United States, and resident of Danbury, in the county of Fairfield and State of Connecticut, has invented certain new and useful Improvements in Tire Chains, of which the following is a specification.

The present invention relates to an improved tire chain, and has for its object to provide a chain having a tread surface which will secure positive traction in mud, snow, or the like, and will effectually prevent skidding upon slippery streets. A further object is to provide a chain which will be held closely to the tire surface, so as to eliminate rattling, and will furthermore accommodate itself to different sized tires. Another object is to provide tread and side members which will not appreciably wear or abrade the tire. Still another object is to provide a chain which will give relatively long service, and will be simple and economical to manufacture.
With the above and other objects in view, an embodiment of the invention is shown in the accompanying drawings, and this embodiment will be hereinafter more fully described with reference thereto, and the invention will be finally pointed out in the claims.

In the drawings:

Fig. 1 is a side elevation showing a tire provided with a chain according to the present embodiment of the invention;

Fig. 2 is a plan view of one of the chain sections, the side member thereof at one side being shown edgewise, while the side member at the other side is shown in plan;
Fig. 3 is a transverse sectional view, taken along the line 3—3 of Fig. 1;

Fig. 4 is a partial sectional view of one of the tread members; and

Fig. 5 is a plan view of a modified form of cross tread.

Similar reference characters indicate corresponding parts throughout the several figures of the drawings.

Referring to Fig. 1 of the drawings, the chain as a whole comprises a pair of circumferential side members and cross tread members, and includes a plurality of yielding sections, having annular elasticity when in place upon the tire, and which are connected by non-yielding links or the like. In the present embodiment four of these yielding sections are provided, one being shown complete in Fig. 2, and comprising a plurality of tread rings 10 arranged in pairs disposed transversely of the tire. The rings may have a slight curvature to substantially conform to the surface of the tire, and are provided at their tire engaging side with a flange portion 11, producing a relatively wide surface for engagement with the tire, and a relatively narrow tread surface. The edges of the ring adjacent the tire are rounded so as not to abrade the same.

At diametrically opposite points the ring is provided with link engaging passages 12 and 13, extending through the flange portion 11 from the upper surface thereof, downwardly therethrough, and outwardly along the lower surface. Each pair of rings is connected centrally by a link 14, engaged in the passages 12, while links 15 are engaged in the passages 13, and connect the rings to the side members to complete the section.

The side members consist of spring wires 16, bent to form a center loop 17, and end loops 18 and 19, and being bowed outwardly between the loops to produce semi-elliptic spring portions. The links 15 are engaged with the loops 17, 18 and 19, so that the complete tread section consists of the two yielding side members and the three pairs of transversely arranged rings extending between them. It will be understood that there may be any desired number of cross ring sections, and that these may have any desired number of rings, the illustrated embodiment being merely a simplified form of the invention. In Fig. 5, for instance, there is illustrated a form in which the cross tread members comprise three rings 10 connected by links 14. The width of the links 14 and 15 and their engaging relation with the passages 12 and 13 and the flange 11, is such that they do not engage either the tire or the street surface, so that in use there is no appreciable wear thereon, or on the surface of the tire.

The several sections are assembled to complete the chain by means of connection links 20, engaged with the end loops 18 and 19 of the side members 16. These links between two of the sections may be split and provided with a spring-tongue hook-end 21, adapted to permit the ends of the chain to be connected and disconnected, so that it may be engaged and disengaged with the tire.

As shown in Fig. 2, the side members 16 may be provided with straight links 22, extending across the bowed spring portion and provided at their ends with loops 23 and 24 connected to the intermediate and end loops of the side member. One such link is illustrated, but it will be understood that the same may be provided across each bowed portion. This link is adapted to resist any unusual strain put upon the chain and to prevent distortion of the side members.

The side members including the bowed spring wires 16 and the connecting links 20 are annularly elastic, and to permit of the circumferential expansion of the chain, so that it will accommodate itself to different sized tires, and at the same time will draw the tread rings radially inward so that they snugly engage the surface. The side members furthermore lie flat against the side surfaces of the tire, and are free from any projections that might abrade or wear upon the same.

The chain according to my invention effectually prevents forward or side skidding, and provides positive traction upon slippery streets, and in mud, snow, or the like. It may be used upon automobiles, tractors, or in fact, any type of vehicle employing tires. The tread rings have a vacuum cup effect, which gives positive traction, while their circular ground engaging surfaces provide equal resistance to skidding in all directions. This is an important feature, when it is considered that the usual type of chain will not prevent side skidding.

I have illustrated a preferred and satisfactory embodiment of my invention, but it is obvious that changes may be made therein within the spirit and scope thereof, as defined in the appended claims.

Having thus described the invention, what I claim and desire to secure by Letters Patent is:

1. In a tire chain, a tread section including a plurality of ring-shaped tread members, each having an annular outwardly extending flange adjacent the tire engaging side, said flange having link engaging passages extending inwardly from the outward surface and outwardly through the periphery thereof, and links extending through said passages and connecting said members, the surface of said links being between the tread and tire engaging surfaces of said tread members.

2. In a tire chain, a tread section, including a pair of side members, each consisting of a bowed spring wire having spaced loops formed therein, and cross tread members connected at their ends to the loops of said side members.

3. In a tire chain, a tread section including a pair of side members, each consisting of a bowed spring wire having spaced cross tread member connecting means, and cross tread members connected at their ends to said connecting means.

4. In a tire chain, a tread section including a pair of side members, each consisting of a spring wire having an intermediate loop, end loops and bowed portions between said loops, and a plurality of cross tread members connected at their ends to the respective intermediate and end loops of said side members.

5. A tire chain, comprising a pair of circumferential side members including a plurality of bowed spring wires, and a plurality of cross tread members connected at their ends to said side members, and including ring-shaped tread elements.

6. A tire chain, comprising a pair of circumferential side members including a plurality of spaced bowed spring wires and links connecting said wires, and a plurality of cross tread members connected at their ends to said side members at the points of connection between said spring wires and links.

Signed at Danbury, in the county of Fairfield and State of Connecticut, this 27th day of March, A. D., 1923.

FREDERICK G. LEE.

Witnesses:
C. M. NEWMAN,
LILLIAN M. ALLING.